(12) United States Patent
Tao

(10) Patent No.: US 9,382,644 B1
(45) Date of Patent: Jul. 5, 2016

(54) DIE TIP FOR MELT BLOWING MICRO- AND NANO-FIBERS

(71) Applicant: Thomas M. Tao, Greer, SC (US)

(72) Inventor: Thomas M. Tao, Greer, SC (US)

( * ) Notice: Subject to any disclaimer, the term of this patent is extended or adjusted under 35 U.S.C. 154(b) by 0 days.

(21) Appl. No.: 14/850,877

(22) Filed: Sep. 10, 2015

Related U.S. Application Data

(60) Provisional application No. 62/152,900, filed on Apr. 26, 2015.

(51) Int. Cl.
| | |
|---|---|
| *D01D 4/06* | (2006.01) |
| *D01D 4/08* | (2006.01) |
| *D01D 5/098* | (2006.01) |
| *D01D 5/32* | (2006.01) |
| *D01D 4/02* | (2006.01) |
| *B29C 47/00* | (2006.01) |
| *B29C 47/30* | (2006.01) |

(52) U.S. Cl.
CPC ............ *D01D 4/025* (2013.01); *B29C 47/0014* (2013.01); *B29C 47/30* (2013.01); *D01D 4/027* (2013.01); *D01D 4/06* (2013.01); *D01D 4/08* (2013.01); *D01D 5/0985* (2013.01); *D01D 5/32* (2013.01)

(58) Field of Classification Search
CPC ......... D01D 4/025; D01D 4/027; D01D 4/06; D01D 4/08; D01D 5/0985; D01D 5/32; B29C 47/0014
See application file for complete search history.

(56) References Cited

U.S. PATENT DOCUMENTS

| | | | |
|---|---|---|---|
| 3,825,379 A | 7/1974 | Lohkamp et al. | |
| 3,825,380 A | 7/1974 | Harding et al. | |
| 3,849,241 A | 11/1974 | Butin et al. | |
| 3,865,535 A | 2/1975 | Langdon et al. | |
| 3,942,723 A * | 3/1976 | Langdon ............... | D01D 5/0985 239/135 |
| 3,970,417 A * | 7/1976 | Page ................... | B29C 47/0014 239/422 |
| 4,486,161 A | 12/1984 | Middleton | |
| 4,720,252 A | 1/1988 | Appel et al. | |
| 4,986,743 A | 1/1991 | Buehning | |
| 5,017,112 A | 5/1991 | Mende et al. | |
| 5,171,512 A | 12/1992 | Mende et al. | |
| 6,057,256 A | 5/2000 | Krueger et al. | |

(Continued)

OTHER PUBLICATIONS

Ellison, Christopher J. et al., "Melt Blown Nanofibers: Fiber Diameter Distributions and Onset of Fiber Breakup" (Polymer), Apr. 2007, pp. 3306-3316, vol. 48, Elsevier Ltd., Minneapolis, MN.
McIntyre, Karen Bitz, Editor, "Nano-Nonwovens Cross Hurdles, Find New Applications" (Nonwovens Industry), Aug. 2012, pp. 32-35, Rodman Media, Ramsey, NJ.

(Continued)

*Primary Examiner* — Yogendra Gupta
*Assistant Examiner* — Joseph Leyson
(74) *Attorney, Agent, or Firm* — Charlotte C. Wilson

(57) ABSTRACT

A melt-blowing die tip includes a first die tip half and a second die tip half with complementary mating surfaces. A flow system is engraved onto at least one of the mating surfaces. The flow system includes linear melt troughs, which are fluidly connected by channels. Spinning orifices downstream of the last melt trough, which may have diameters over an exceptionally broad range, produce fibers as small as nano-scale. Fasteners secure the two die tip halves, and at least one of the channels includes a curved portion to direct flow around a fastener. The resulting die tip has increased pressure tolerance, greater productivity, reduced costs, and supports the economical mass production of super fine fibers. Optionally, an engraved die plate may be inserted between the die tip halves. When both sides of the die plate are engraved with a flow system, the die may produce bi-component fibers.

10 Claims, 5 Drawing Sheets

(56) References Cited

U.S. PATENT DOCUMENTS

| | | |
|---|---|---|
| 6,491,507 B1 | 12/2002 | Allen |
| 6,565,344 B2 | 5/2003 | Bentley et al. |
| 2007/0205530 A1* | 9/2007 | Thompson ........... D01D 5/0985 264/211.14 |

OTHER PUBLICATIONS

Ohmura, Kin, "Competition Among Nanofiber Nonwovens Makers" (Nonwovens Industry), Jun. 2014, p. 22, Rodman Media, Ramsey, NJ.

* cited by examiner

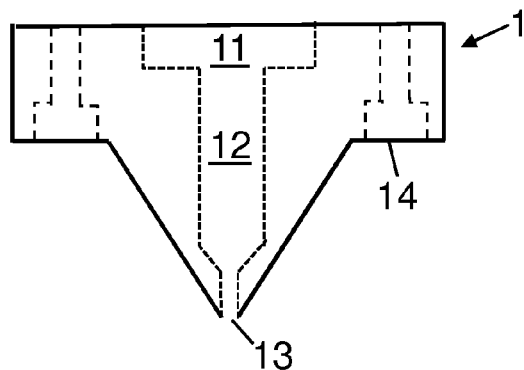
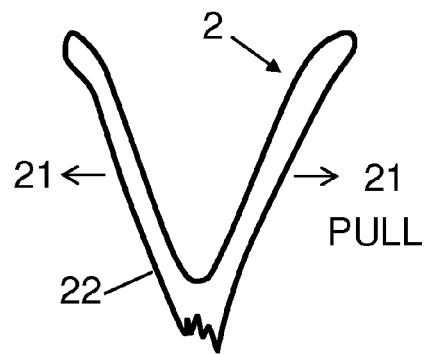
FIG. 1
PRIOR ART
FIG. 2
PRIOR ART
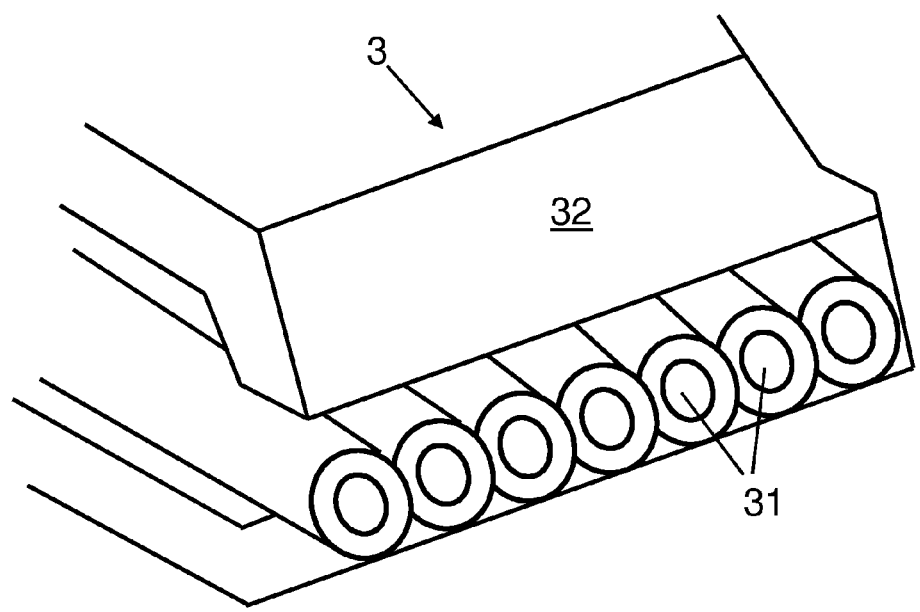
FIG. 3
PRIOR ART

A-A VIEW

B-B VIEW

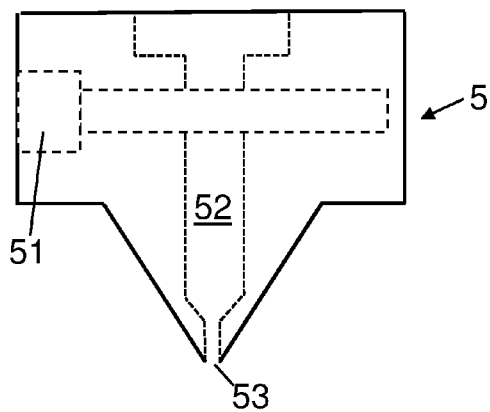
FIG. 5
PRIOR ART
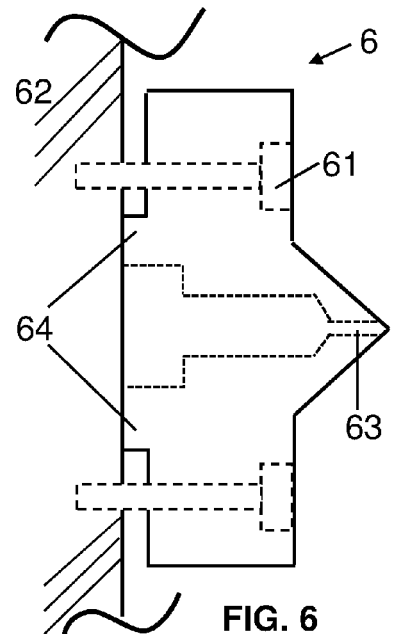
FIG. 6
PRIOR ART
FIG. 7
PRIOR ART
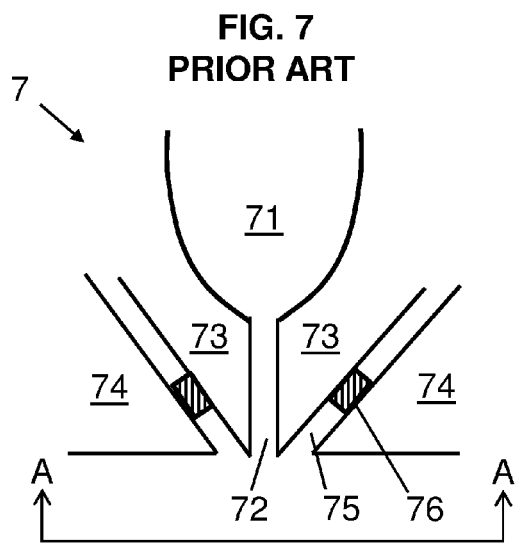
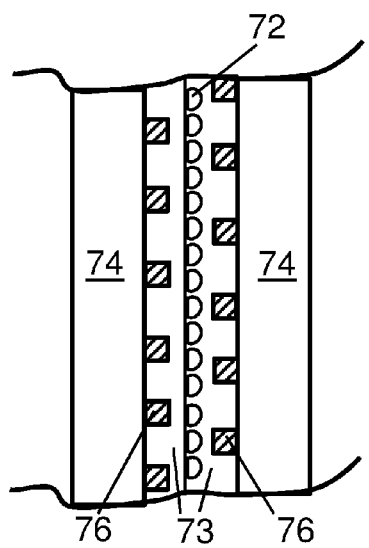
A-A VIEW

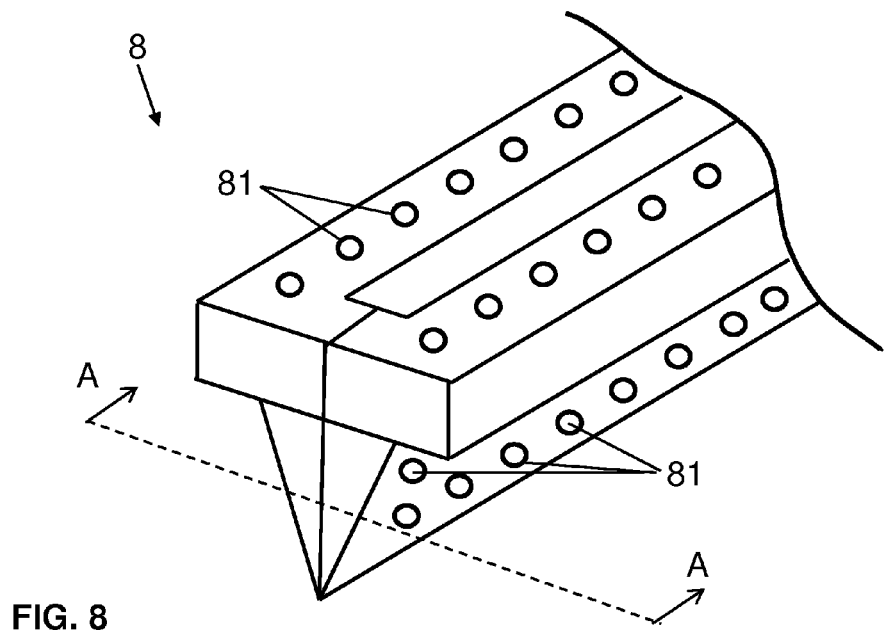
FIG. 8
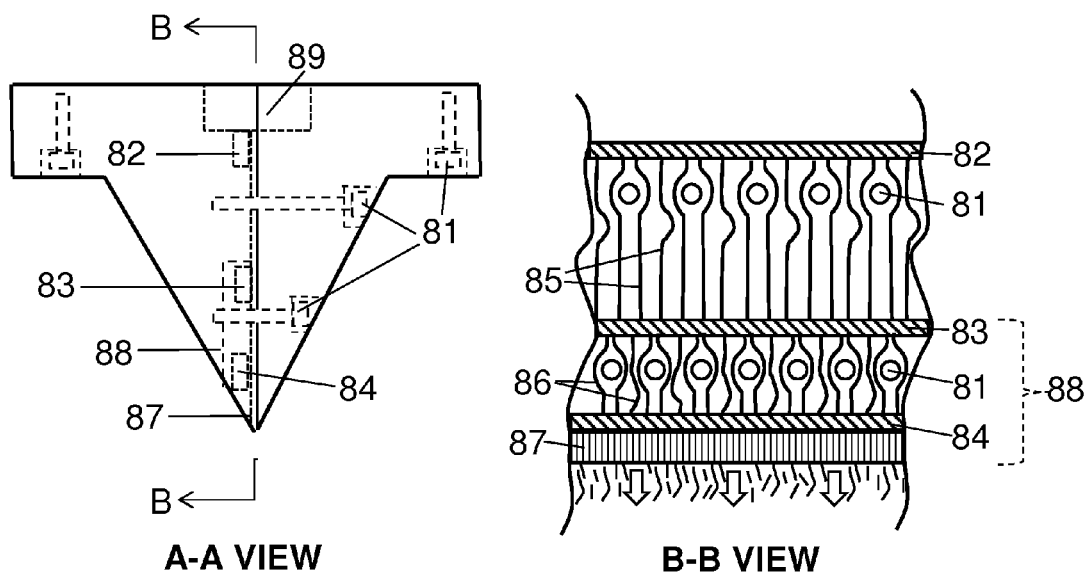
A-A VIEW    B-B VIEW

DIE TIP FOR MELT BLOWING MICRO- AND NANO-FIBERS

CROSS-REFERENCE TO RELATED APPLICATIONS

This application is a non-provisional application, which claims the benefit of U.S. Provisional Application Ser. No. 62/152,900, filed Apr. 26, 2015, the entire disclosure of which is incorporated herein.

TECHNICAL FIELD

The present disclosure relates to melt-blowing nonwoven technology and, more specifically, to a fiber extrusion device suitable for making fibers of various average diameters ranging from nanometers to microns. More particularly, the present disclosure presents a new design for a component of the fiber extrusion apparatus known as the die tip or nose piece of a melt-blowing apparatus.

BACKGROUND

Nonwoven products are widely used for filtration, absorption, adsorption, insulation, covering, supporting, and cushioning. For these applications, melt-blowing (MB) technology yields exceptional products, due to the ability to create very small fiber diameters and pores along with exceptionally large specific fiber surface area. In making such fibers, the melt-blowing apparatus is provided with an integral component known as the die tip or nosepiece, which filters the incoming polymer melt flow and converts it into a large number of liquid filaments of desired diameter for further treatment and bonding into a nonwoven web, substrate, or cartridge.

The die tip is a delicate and expensive device that requires trained and careful use and maintenance. Its features and condition directly affect production capacity and product quality. An exemplary die tip 1 is shown in FIG. 1. The die tip 1 attaches, via mounting screws 14, to a die body (not shown) having a die body channel into which a polymer melt or solution is introduced. For convenience herein, the polymer being extruded will be referred to as a "polymer melt" or "molten polymer", but it should be understood that a polymer solution might instead be used.

The die tip 1 includes a centrally located channel 12 for receiving the polymer melt or solution. A filter media may be located in a recess 11 between the die body channel and the die tip channel 12 to prevent impurities from passing into the die tip channel 12. A row of orifices 13 is drilled through the downstream end of the die tip channel 12. The size of the orifices 13 is an important determinant to the average fiber diameter of the fibers produced thereby. The molten polymer stream exiting from the orifices 13 is attenuated by air knives of high pressure (not shown) to form fibers that are bonded on a collector surface, such as a conveyor belt or rotating mandrel, to produce a nonwoven substrate or cartridge.

There are several issues with existing die tips for melt-blowing apparatuses. First, die tip problems are common and costly to the manufacturing process. Routine wear, aging, and contamination may cause costly product irregularities or off-quality. In the most extreme cases, the die tip may be cracked open by a pressure surge from the polymer melt (a phenomenon known by operators as a "zipper" or "unzipper" condition). As shown in FIG. 2, the die tip 1 has a "wishbone" shape 2 that is susceptible to pressure forces in a lateral direction 21, which may lead to cracking in an area 22 slightly upstream of the orifice 13.

Occasionally, manufacturers try to repair the die tip 1 for continued use. The use of repaired die tips is risky, especially in heavy-duty environments. However, such risks must be weighed against the time and expense associated with obtaining replacement die tips or with maintaining an inventory of spare die tips. Another issue is that various die tip fabricators build die tips with different design details, so the die tips generally are not interchangeable among apparatuses.

Since the introduction of melt blowing technology, engineers have made repeated efforts to improve the original die tip design (as shown in FIG. 1). Representative patents in this area include, without limitation:

A. U.S. Pat. Nos. 3,825,379; 5,017,112; and 5,171,512 suggest the use of capillary tubes to replace drilled orifices in the die tip. As shown in FIG. 3, a die tip 3 includes a die tip apex 32 through which are arranged a row of capillary tubes 31, which convey the polymer melt into the attenuating air knives. The improvement in fiber extruding capability is not convincing. Moreover, because the die tip apex 32 is separated to accommodate the capillary tubes 31, the die tip body is weakened. As shown in FIG. 2, the weakened die tip body is prone to cracking. Thus, with no convincing evidence of improvement in fiber extrusion capability, the use of this particular design appears without merit.

B. U.S. Pat. No. 3,849,241 teaches a split-body die tip, in an effort to avoid the tedium and expense of the orifice drilling procedure. As mentioned above, a split die tip body is structurally weak and exhibits low resistance to internal fluid pressure. While this approach may be useful on small laboratory models, it lacks the robustness and integrity required for production scale.

C. U.S. Pat. No. 3,865,535 attempts to provide a split-body die tip for production scale, that is, for wide melt-blowing apparatuses. As shown in FIG. 4, a die tip 4 is made of two halves joinable along the longitudinal axis of the die tip 4. A side cross-sectional view, as taken along line A-A of the perspective view, shows a melt reservoir 42, which delivers polymer to a row of drilled orifices 41. The two dip tip halves are assembled together by bonding agents applied on the available contact area 43, namely at the two ends and part of the apex area. Substances suggested for bonding the die tip halves include silver brazing solder, thermosetting epoxy resin, and other bonding agents for metals. In practice, such bonding agents were insufficient to hold the die tip together for a long time and under high internal pressure. Additionally, the routine cleaning of the die tip in an autoclave exposes the die tip to temperatures of 1,000° F. to 1,500° F. for hours, which reduces the life of the bonding agents. For these reasons, the bonded die tip fails to meet the needs of the industry.

D. U.S. Pat. No. 4,486,161 aims to improve the pressure resistance of a die tip 5 by employing several large screws 51 to hold together the upstream and downstream portions of the die tip body, as shown in FIG. 5. In this die tip, screws 51 are located at equal spacing along the length of the die tip body and are pre-tightened in anticipation of the melt pressure. As a consequence, a large and dangerous bending moment is applied to the die tip apex through which the orifices 53 are drilled. Another issue with this design is that, because large bolts (51) sit inside the die tip reservoir 52, the flow uniformity created by the upstream die body is disrupted and the maintenance of the die tip apex is complicated.

E. U.S. Pat. No. 4,986,743 suggests a technique to prestress a die tip 6, when it is installed onto the melt-blown die body 62, as shown in FIG. 6. Mounting screws 61 are used to secure the die tip body 6 to the die body 62. The die tip 6 includes drilled orifices 63 for producing melt-blown fibers. The die tip 6 is provided with gaps between the upstream surface of the die tip body and the downstream surface of the die body 62, creating a fulcrum point 64 about which the die tip body 6 is bent. The gaps and screws 61 induce a stress, which is purported to enhance the pressure tolerance of the die tip 6. While this idea is simple and may be valid, its implementation requires skill and precision, and its actual benefit is incremental and imprecise.

F. U.S. Pat. No. 4,720,252 proposes another concept for a split-body die tip 7, as shown in FIG. 7. In die tip 7, the polymer flows from a melt reservoir 71 through drilled orifices 72 in a die tip apex 73. Heated, pressurized air from air knives 74 flows through air gaps 75 to attenuate the melt-blown fibers. Within the air gap 75, multiple brace pieces 76 are spaced evenly and are welded to both the die tip apex 73 and the adjacent edges of the air plates 74 to buttress the halves of the die tip apex 73. The multiple brace pieces 76, which are small metal plates, compromise the uniformity of the air knives. Additionally, because the air plates 74 and the brace pieces 76 are relatively thin and are incapable of providing significant support, the integrity of the die tip 7 remains weak. Operation and maintenance of a melt-blowing apparatus using this die tip 7 are complicated, making the merit of this proposed device questionable at best.

As evident from the preceding discussion, none of the prior art inventions has successfully replaced the original and conventional design of the die tip, as shown in FIG. 1. Since none of the prior art inventions has successfully addressed the problems of the conventional die tip, a need for an improved die tip remains unmet in the industry.

Another shortcoming shared by the die tip assemblies of FIGS. 1 through 7 is their collective inability to produce fibers of a very small diameter (e.g., submicron size fibers and smaller). A micron is one-millionth of a meter. The term "nano-fibers" is used to describe fibers having an average diameter size measured in nanometers (nm), or one-billionth of a meter. The term "submicron fibers" refers to fibers having an average diameter size of between 500 and 999 nm. Nano-fibers having an average diameter of between 100 and 500 nm and submicron fibers having an average diameter of between 500 and 999 nm are of particular commercial interest and are difficult to obtain using presently available die tips.

Since the introduction of very small fibers, they have been used in numerous new applications, such as biomedical (e.g., synthetic tissues, organs, skin, blood vessels; wound healing; drug release; metal ion adsorption for detoxification), carriers for enzymes and catalysts, sensors, weapons and warfare, environmental protection, water/gas filtration and purification, personal protection/care, energy devices (e.g., lithium batteries, super capacitors, fast chargers, solar cells, fuel cells, hydrogen and natural gas storage/transportation, renewable energy harvest and storage, electric vehicles), electronics, membrane replacements, and the like.

In the production of very fine fibers, such as submicron and nano-fibers, melt-blowing competes with electro-spin technology. Electro-spin technology has successfully produced fibers as fine as 100 nm in tiny quantities, while the best available melt-blowing devices are capable of producing slightly coarser fibers ranging from 350 to 500 nm with greater economy. Accordingly, both technologies have a potential for advancement and would benefit from improvements thereto.

Recent studies and the inventor's experience suggest that the major impediments to creating melt-blown nano-fibers (less than 500 nm) are the currently available die and the die tip. Conventional dies and die tips used for extruding melt-blown fibers are unable to process melts of super low viscosity and are unable to withstand the extremely high pressures required for very small orifices. For example, conventional dies and die tips are typically designed for pressures of about 600 psi to 900 psi (pounds per square inch), whereas pressures of 3000 psi or greater may be necessary for producing very fine fibers. Conventional die tips, such as those described above, also simply do not have orifices that are small enough to produce the target fiber size. Specifically, to produce very fine (submicron or nano-) fibers successfully, the die tip requires orifices with smooth and uniform walls and with diameters in the range of 0.01 mm to 0.1 mm, while the smallest orifices in currently available die tips are only 0.2 mm (0.008 inches), and die tips having these tiny orifices are available only from a limited number of sources at often prohibitively high costs.

Raising the air-to-melt mass flow ratio and lowering the melt viscosity are known to help reduce fiber diameter. However, when the force of wind shear becomes too strong and the visco-elastic properties and surface tension of the melt become too weak for fiber forming, a spray of droplets results instead of melt filaments. Such a situation was observed by Ellison et al., in their article "Melt Blown Nanofibers: Fiber Diameter Distributions and Onset of Fiber Breakup", published in 2007 by Elsevier in Volume 48, pages 3306-3316, of "Polymer" journal. The authors were able to produce melt-blown fibers only as fine as 350 to 500 nm on a laboratory scale apparatus.

Therefore, there has long been a strong desire for a better die tip design that is economical, simple, rugged, pressure resistant and that is easy to build, maintain, and repair. Moreover, there is a need in the industry for a die tip capable of withstanding high pressures in a mass production environment, which includes super small orifices for producing very fine fibers in the micron, submicron, and nano scales.

SUMMARY

A melt-blowing die tip includes a first die tip half and a second die tip half with complementary mating surfaces. A flow system is engraved onto at least one of the mating surfaces. The flow system includes linear melt troughs, which are fluidly connected by channels. Spinning orifices downstream of the melt troughs produce fibers having a very small diameter. Fasteners secure the two die tip halves, and at least one of the channels includes a curved portion to direct flow around at least one fastener.

The size of the orifices may be selected from a broad range of sizes, resulting in fibers from macro- to nano-size. Advantageously, the present die tip has increased pressure tolerance, greater productivity, reduced costs, and supports the economical mass production of super fine fibers. Optionally, an engraved die plate may be inserted between the die tip halves. When both sides of the die plate are engraved with a flow system, the die may produce bi-component fibers.

The die tips described herein provide a number of advantages, including significantly improved die tip pressure tolerance; greatly simplified manufacturing of orifices; and reduced costs. Die tips having exceptionally small orifices may now be produced economically and with the durability required for mass production of submicron- and nano-scale fibers.

In embodiments in which the optional die plate is employed, the die plate is the only part that needs thorough cleaning after use. Indeed, the die plate is easily removable and replaceable to facilitate changes in production specifications. Further, since the die plate dictates the properties (e.g., diameter) of the melt-blown fibers, it is no longer necessary for manufacturers to carry an inventory of spare die tips.

These and other advantages will become apparent from a review of the disclosure in its entirety.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which:

FIG. 1 is a cross-sectional view of a conventional melt blown (MB) die tip, according to the prior art;

FIG. 2 is a cross-sectional view of a wishbone, which illustrates how a conventional die tip reacts to pressure;

FIG. 3 is a perspective view of a die tip that employs capillary tubes in place of drilled orifices, according to the prior art;

FIG. 4, A-A view is a cross-sectional view of the split-body die tip of FIG. 4, as taken along line A-A; and FIG. 4, B-B view is a cross-sectional view of the split-body die tip of FIG. 4, as taken along line B-B of the view shown in FIG. 4, A-A view;

FIG. 5 is a cross-sectional view of a die tip that is reinforced with screws, according to the prior art;

FIG. 6 is an overhead plan view of a die tip pre-stressed by its mounting screws, according to the prior art;

FIG. 7 is a cross-sectional side view of a split-body die tip with buttresses at its apex, according to the prior art; and FIG. 7, A-A view is a cross-sectional end view of the split-body die tip of FIG. 7, as taken along line A-A;

FIG. 8 is a perspective view a die tip of present invention; FIG. 8, A-A view is a transverse cross-sectional view of the die tip of FIG. 8, as taken along line A-A; and FIG. 8, B-B view is a longitudinal cross-sectional view of the die tip of FIG. 8, as taken along line B-B of FIG. 8, A-A view.

Their elements and reference numbers are listed in TABLE 1 below.

TABLE 1

Figure 4:
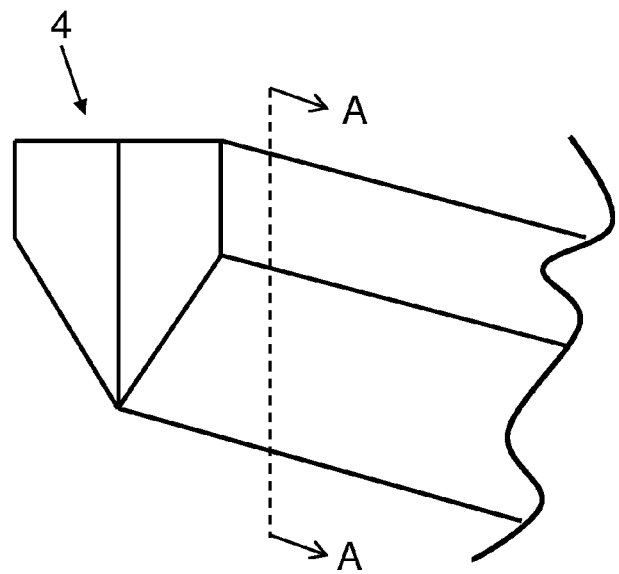
FIG. 4 is a perspective view of a split-body die tip that is secured by a bonding agent or brazing paste, according to the prior art.
Figure 4:
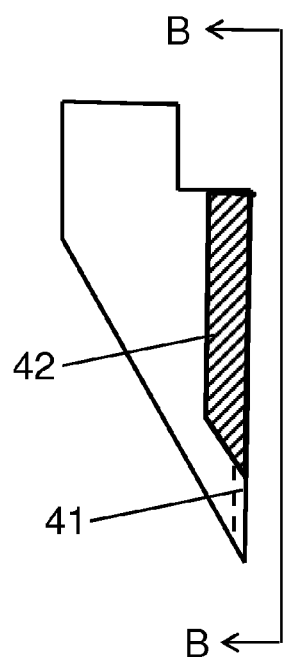
Figure 4:
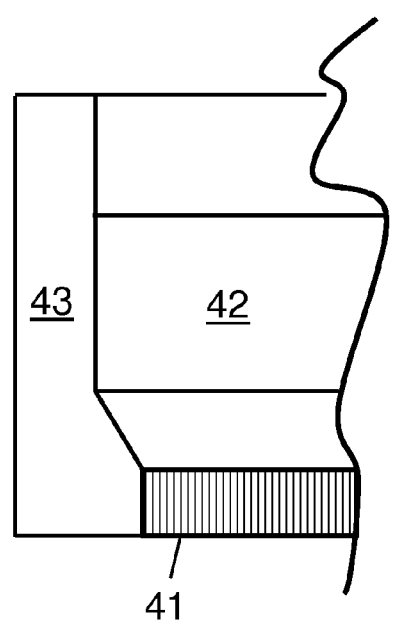

| Component List for FIGS. | | | |
|---|---|---|---|
| FIG. 1 and 2 | | | |
| 1 | die tip body | 13 | die tip orifices |
| 11 | recess for filter media | 14 | mounting screws |
| 12 | channel for polymer melt | | |
| FIG. 2 | | | |
| 2 | wishbone shape | 22 | area prone to cracking |
| 21 | direction of lateral forces | | |
| FIG. 3 | | | |
| 3 | die tip body | 32 | die tip apex |
| 31 | capillary tubes | | |
| FIG. 4 | | | |
| 4 | die tip body | 42 | melt reservoir |
| 41 | die tip orifices | 43 | soldered or bonded areas |
| FIG. 5 | | | |
| 5 | die tip body | 52 | melt reservoir |
| 51 | bolts | 53 | die tip orifices |

TABLE 1-continued

Figure 9:
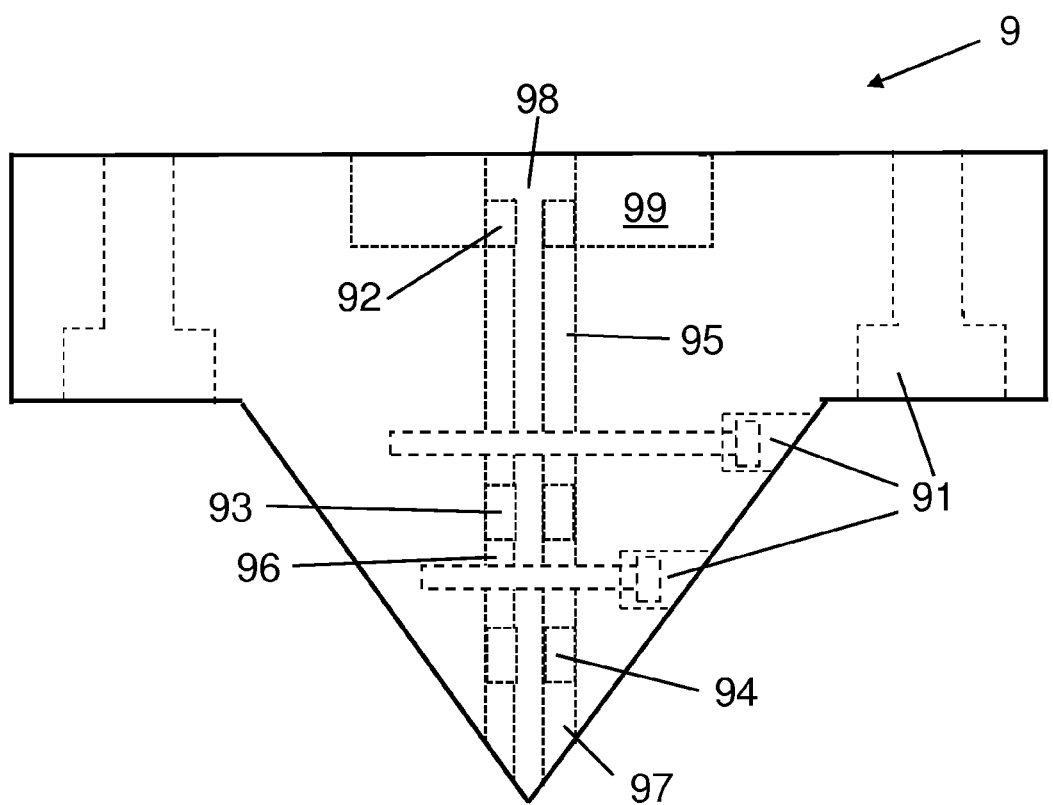
FIG. 9 is a cross-sectional side view of a bi-component die tip of the present invention.

| Component List for FIGS. | | | |
|---|---|---|---|
| FIG. 6 | | | |
| 6 | die tip body | 63 | die tip orifices |
| 61 | mounting screws | 64 | fulcrum for bending |
| 62 | die body | | die tip body |
| FIG. 7 | | | |
| 7 | die tip body | 74 | air plates |
| 71 | melt reservoir | 75 | air gap |
| 72 | die tip orifices | 76 | buttress pieces |
| 73 | die tip apex | | |
| FIG. 8 | | | |
| 8 | die tip body | 85 | primary channels |
| 81 | assembly screws | 86 | secondary channels |
| 82 | first melt trough | 87 | engraved die tip orifices |
| 83 | second melt trough | 88 | die tip plate |
| 84 | third melt trough | 89 | recess for filter media |
| FIG. 9 | | | |
| 9 | bi-component die tip body | 95 | primary channels |
| 91 | assembly screws | 96 | secondary channels |
| 92 | first melt trough | 97 | engraved die tip orifices |
| 93 | second melt trough | 98 | die tip plate |
| 94 | third melt trough | 99 | recess for filter media |

DETAILED DESCRIPTION

Reference will now be made in detail to embodiments of the inventive products and methods, one or more examples of which are illustrated in the drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Each example is provided by way of explanation of the invention, not limitation of the invention. In fact, it will be apparent to one of ordinary skill in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as fall within the scope of the appended claims and their equivalents.

FIG. 8 illustrates an improved die tip 8, according to a first aspect of the present invention. The die tip 8 is made of two halves that have symmetrical profiles about the longitudinal (cross-machine direction) axis of the die tip 8. The halves are joined by fasteners, such as screws and/or bolts 81. For convenience, the fasteners may be referred to hereafter as screws, but such reference is not meant to limit the invention to any particular fastener type.

The complementary contacting surfaces of both halves are finished and polished for intimate contact. Optionally, a sealing material, such as a gasket, a gasket film, or a liquid gasket, may be positioned between the die tip halves to help seal the die tip halves.

A polymer melt is introduced from a die body (not shown) and flows through a recess 89, which may include a filter media for removing impurities. Rather than flowing into a voluminous reservoir (such as channel 12 in FIG. 1), the polymer melt is directed through a flow system that includes a series of flow paths that are carved or engraved on one half of the die tip 8 or onto a rectangular plate 88 that is inserted into one half of the die tip 8. The flow system may include a number of linear melt troughs 82, 83, 84; connecting channels 85, 86; and spinning orifices 87.

Initially, the polymer melt is directed into a first linear melt trough 82 that distributes the molten polymer along the width of the die tip 8. From the first melt trough 82, the polymer flows into a series of primary channels 85, which are spaced evenly in the cross-machine direction (width) and which are engraved or carved in one half of the die tip 8. The channels 85 have equal length and cross-sectional area for uniform flow distribution and may have slightly curved portions to direct the polymer flow around the screws 81.

The primary channels 85 direct the polymer flow into a second melt trough 83 carved or engraved in the rectangular plate 88, where the flow is made uniform for further distribution to a series of secondary channels 86 also formed in the rectangular plate 88. The secondary channels 86 are also spaced evenly in the cross-machine direction and have their own uniform length and cross-sectional area. As with the primary channels 85, the secondary channels 86 may have slight curvatures to direct the polymer flow around the screws 81. The secondary channels 86 guide the polymer flow into a third melt trough 84 carved or engraved in the rectangular plate 88, the third melt trough 84 being parallel to the first melt trough 82 and the second melt trough 83.

The rectangular plate 88 is further carved or engraved with a number of spinning orifices 87, which are downstream from and fluidly connected to the third melt trough 84. Since U.S. Pat. No. 3,825,380 teaches that the shape of the orifice has no significant impact on the melt-blowing operation, the orifices 87 may have a semi-circular, semi-elliptical, rectangular, or any other cross-sectional shape determined to be practical. Each orifice 87 has a length that is at least ten times its hydraulic diameter. The hydraulic diameter is defined as four times the cross-sectional area divided by the wetted perimeter, according to Perry & Chilton's "Chemical Engineers' Handbook," fifth edition, published in 1973 by McGraw Hill.

Such a die tip 8 is simple, robust, and durable, with the exception of the orifices 87 in the apex, which receive wear and tear from use, cleaning, and accidental impact. The rectangular plate 88, referenced above, addresses these concerns. All or some portion of the melt troughs 82, 83, 84; the channels 85, 86; and the spinning orifices 87 may be engraved on the rectangular plate 88, which, when inserted, forms one half of the die tip 8. As shown, the rectangular plate 88 has a length shorter than the length of the die tip 8, but the length of the rectangular plate 88 may approximate the length of the die tip 8 (in which case all of the troughs, channels, and orifices may be engraved therein). The plate 88 is removable, reusable, economical, and, if desired, may be discarded after several uses.

Usually, the size of the orifices 87 is specifically chosen for a given nonwoven product or group of products. When the manufacturer wishes to produce melt-blown fibers of a different size, the rectangular plate 88 may be removed and replaced with another rectangular plate 88 having orifices 87 of the desired dimension. Such an arrangement reduces the number of spare die tips that are needed, because the present die tip 8 is configured to accommodate rectangular plates 88 having spinning orifices 87 of any dimension for the production of virtually any product.

FIG. 9 illustrates a variation of the die tip 8 of FIG. 8. According to a second aspect of the disclosure, a die tip 9 is provided, which is capable of producing bi-component fibers. The die tip 9 is made of two halves that have symmetrical profiles about the longitudinal axis of the die tip 9 and between which is inserted a rectangular die plate 98. The halves are joined to one another and to the die plate 98 by screws or bolts 91. The contacting surfaces of the components are finished and polished for intimate contact.

A first polymer melt is introduced from a die body (not shown) and flows through one half of a recess 99, which may include a filter media for removing impurities. A second polymer melt is introduced from a die body (not shown) and flows through a second half of the recess 99. Rather than flowing into a voluminous reservoir (such as channel 12 in FIG. 1), the polymer melts are directed through a series of flow paths that are carved or engraved on each side of the die plate 98 that is inserted between the halves of the die tip 9. The flow paths may include a number of linear melt troughs 92, 93, 94; connecting channels 95, 96, and spinning orifices 97.

Initially, each polymer melt is directed into a respective first linear melt trough 92 that distributes the molten polymer along the width of the die tip 9. From the first melt trough 92, the polymer flows into a series of primary channels 95, which are spaced evenly in the cross-machine direction (width). The channels 95 have equal length and cross-sectional area for uniform flow distribution and may have slight curvatures to direct the polymer flow around the screws 91.

Each set of primary channels 95 directs its respective polymer flow into a respective second melt trough 93 carved or engraved on the rectangular plate 98, where the flow is made uniform for further distribution to a respective series of secondary channels 96 also formed in the rectangular plate 98. The secondary channels 96 are also spaced evenly in the cross-machine direction and have their own uniform length and cross-sectional area, which may be different from the length and area of the primary channels 95. As with the primary channels 95, the secondary channels 96 may have slight curvatures to direct the polymer flow around the screws 91. The secondary channels 96 guide their respective polymer flow into a respective third melt trough 94 carved or engraved in the rectangular plate 98, the third melt troughs 94 being parallel to the first melt troughs 92 and the second melt troughs 93.

Each side of the rectangular plate 98 is further carved or engraved with a number of spinning orifices 97, which are downstream from and fluidly connected to the third melt troughs 94. The orifices 97 on each side of the rectangular plate 98 may be the same as each other or may have different sizes or cross-sectional shapes to produce a wide variety of different products. As the first polymer melt and the second polymer melt are dispensed from the orifices 97 on their respective sides of the rectangular plate 98, a bi-component fiber is produced.

The die tips 8, 9 of the present disclosure provide several significant advantages over the prior die tip designs, many of which are discussed herein. Specifically, and without limitation, these advantages include:

1. The time, labor, and expense of fabricating a die tip are significantly reduced.
2. The method of forming the spinning orifices by carving or engraving, rather than drilling, allows orifices in a wide variety of sizes (e.g., from 0.01 mm to 1 mm) to be provided economically.
3. The flow system (that is, the melt troughs and channels) and the orifices may be made in a disposable and replaceable part, by virtue of the die plate (88, 98), for further savings in time, labor, and expense.
4. The flow system is spread out and is relatively shallow, causing the polymer melt flow to receive rapid and even heat transfer from the die tip body. Such even heating benefits product quality.

5. The shallow troughs and channels of the present flow system provide equal distance, speed, shear rate, and residence time for the polymer flow being directed toward the orifices, whereas the large, wide, and deep cavity of the flow system of conventional die tips is incapable of achieving the aforementioned requirements. In addition, the flow in the large cavities of conventional die tips may experience lateral movement as well as eddies, resulting in non-uniform flow to the orifices. Hence, the flow uniformity of the present die tips is superior.

6. The present die tips are capable of holding several thousand pounds per square inch (psi) of pressure, due to the small troughs and channels, which expose only a small area to the pressure of the polymer melt. Moreover, the use of screws throughout the die tip assembly protects the entire area uniformly from buckling or undue strain. The screws do not interfere with the melt flow. In contrast, conventional die tips having a large deep cavity are capable of withstanding only hundreds of pounds per square inch of pressure. Conventional die tips have a wishbone-like structure with weak resistance to the large bending moment at their apex. Consequently, the breaking point of conventional die tips is typically between 500 and 1000 psi, depending on the die width, with wider die tips breaking more easily due to the greater distance between their two solid ends.

7. When both sides of the die plate 88 are engraved with a flow system including troughs, connecting channels, and orifices, the die tip is configured to spin bi-component fibers.

8. The present die tip designs, with their exceptionally small orifice size and uniquely high pressure tolerance, are suitable for the economic and efficient mass production of very fine fibers (e.g., submicron or nano-scale fibers).

For at least these reasons, the die tips of the present disclosure are believed to offer a significant advance in the state of the art.

The preceding discussion only illustrates the principles of the presently disclosed die tip device and its related parts. It will be appreciated that those skilled in the art may be able to devise various arrangements, which, although not explicitly described or shown herein, embody the principles of the invention and are included within its spirit and scope. For example, the number, shape, sizes and location pattern of described troughs, channels and screws may vary in infinite ways for to fit various circumstances, but they still all fall within the spirit and scope of the invention. Furthermore, all examples and conditional language recited here are principally intended to be for educational purposes and to aid the reader to understand the principles of the invention and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Terms, such as "screw", "bolt", "width direction", "CD", "melt", "fluid", "channels", "troughs", "orifices", and the like, are intended only to aid in the reader's understanding of the drawings and are not to be construed as limiting the invention being described to any particular orientation, matter or configuration, unless recited in the claims.

This description of the exemplary embodiments is intended to explain a new design in connection with the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

What is claimed is:

1. A melt-blowing die tip comprising:
a first die tip half having a first mating surface;
a second die tip half, the second die tip half having a second mating surface complementary to the first mating surface;
a flow system engraved onto at least one of the first mating surface and the second mating surface, the flow system comprising:
a first melt trough and a second melt trough parallel to the first melt trough;
a plurality of primary channels fluidly connecting the first melt trough to the second melt trough; and
a plurality of spinning orifices disposed downstream of and fluidly connected to the second melt trough for producing melt-blown fibers;
and a plurality of fasteners securing the first die tip half to the second die tip half;
wherein at least one of the primary channels in the flow system includes a curved portion to direct flow around at least one of the fasteners.

2. The melt-blowing die of claim 1, wherein the flow system further comprises a third melt trough upstream of and parallel to the first melt trough; and a plurality of secondary channels fluidly connecting the first melt trough to the third melt trough.

3. The melt-blowing die of claim 2, wherein each of the primary channels has a first length and a first cross-sectional area; and wherein each of the secondary channels has a second length and a second cross-sectional area.

4. The melt-blowing die of claim 3, wherein the first length is different from the second length.

5. The melt-blowing die of claim 1, wherein the fasteners are one or more of screws and bolts.

6. The melt-blowing die of claim 1, wherein the spinning orifices have a diameter of from about 0.005 mm to about 1 mm.

7. The melt-blowing die of claim 1, wherein the second die tip half defines a recessed portion therein; and wherein the die further comprises a die plate configured to fit within the recessed portion and mate with the first die tip half, the die plate being engraved with at least a portion of the flow system.

8. The melt-blowing die of claim 7, wherein the die plate is rectangular.

9. The melt-blowing die of claim 7, wherein the second die tip half has a die tip length and wherein the die plate has a die plate length, the die plate length being less than the die tip length.

10. The melt-blowing die of claim 1, further comprising a die plate configured to fit between the first die tip half and the second die tip half, the die plate having a first side adjacent the first die tip half and a second side adjacent the second die tip half, both the first side and the second side of the die plate being engraved with the flow system; wherein the die tip is configured for producing bi-component fibers.

* * * * *